United States Patent [19]

Platt et al.

[11] 3,859,637

[45] Jan. 7, 1975

[54] ON-CHIP AUXILIARY LATCH FOR DOWN-POWERING ARRAY LATCH DECODERS

[75] Inventors: Steven Platt, Underhill, Vt.; Jehoshua N. Pomeranz, Suffern, N.Y.; Dinesh K. Tewarson, Essex Junction, Vt.

[73] Assignee: International Business Machines Corporation, Armonk, N.Y.

[22] Filed: June 28, 1973

[21] Appl. No.: 374,616

[52] U.S. Cl. ........... 340/173 R, 340/172.5, 307/238

[51] Int. Cl. ........................................... G11c 11/40

[58] Field of Search .................. 340/173 R, 173 CP

[56] References Cited

UNITED STATES PATENTS

| | | | |
|---|---|---|---|
| 2,825,821 | 3/1958 | Logue | 340/173 R |
| 3,736,569 | 5/1973 | Bouricius | 340/173 CP |
| 3,764,833 | 10/1973 | Ayling | 340/173 CP |

*Primary Examiner*—Terrell W. Fears
*Attorney, Agent, or Firm*—Robert J. Haase

[57] ABSTRACT

A monolithic semiconductor array of bi-level powered memory cells is provided with a number of on-chip row and column primary latching circuits. The primary latching circuits allow for the down-powering of the on-chip row and column address decoders after a particular chip and a particular storage cell on the chip have been selected by a respective address signal and a set signal. An auxiliary latching circuit, substantially identical to each of the aforesaid primary latching circuits, also is provided on-chip and receives the same set signal as does each primary latching circuit. The primary latching circuits and the auxiliary latching circuit are "set" substantially simultaneously by the set signal. The setting of the auxiliary latching circuit initiates a signal which downpowers each of the on-chip address decoders. Means are also provided on-chip for resetting each of the selected primary and the auxiliary latching circuits upon the termination of the chip select signal.

5 Claims, 5 Drawing Figures

ON-CHIP AUXILIARY LATCH FOR DOWN-POWERING ARRAY LATCH DECODERS

BACKGROUND OF THE INVENTION

U.S. Pat. No. 3,732,440, issued May 8, 1973 to Steven Platt et al for Address Decoder latch and assigned to the same assignee as the present patent application refers to the known fact that the overall power supplied to electronic device arrays such as transistor memory cell arrays can be significantly reduced by the technique of "bilevel" powering. The bilevel powering is conveniently achieved by use of memory cells such as disclosed in U.S. Pat. No. 3,537,078, issued Oct. 27, 1970 to Jehoshua Pomeranz for Memory Cell With A Non-Linear Collector Load and assigned to the same assignee as the present patent application. The bilevel powering of the cell is accomplished with the aid of word and bit line address signals from respective address decoder circuits which continuously draw power. According to the aforementioned U.S. Pat. No. 3,732,440, the power delivered to the overall array circuits can be further reduced by the provision of a respective latching circuit for each row and each column of memory cells in the array. Each latching circuit is placed between the respective word or bit lines of U.S. Pat. No. 3,537,078 and the associated row or column of memory cells. In effect, each selected latch "remembers" the addressing signals which have selected the particular row or column of the array in which the latch is placed and allows for the down-powering of the addressing circuits after the latch has been set (selected) for the remainder of the select cycle and up to the time before the next cell selection interval commences. Substantial power is saved by powering the latches in lieu of powering the corresponding addressing circuits.

Each row and column pair of latching circuits, when set, apply a relatively high power level to the corresponding (selected) memory cell facilitating reading or writing. All unselected latching circuits (those which are not set during a given cell selection interval) supply a relatively low power level to their respective memory cells in accordance with the well known bilevel powering technique. Many techniques are potentially available for down-powering the address decoders after the selected latching circuits have been set. It is especially important, however, that the down-powering of the address decoders be accomplished in a reliable manner at the earliest practical time in order that maximum power conservation may be achieved with respect to the overall memory array circuits.

SUMMARY OF THE INVENTION

An array of electronic devices is addressed with minimum expenditure of power by provision of a respective primary latching circuit for each row and column of array cells and an auxiliary latching circuit for down-powering the address decoder circuits utilized in the selection of a particular cell and the respective primary latching circuits. All of the primary latching circuits and the auxiliary latching circuits are of substantially the same circuit design and preferably are produced in monolithic semiconductor chip form by the same process so that process variations, if any, essentially equally effect the performance of the primary as well as the auxiliary latching circuits. The selected primary and the auxiliary latching circuits are set by common circuitry whereby the setting of said latches is essentially simultaneous. Upon the setting of the auxiliary latching circuit, a signal is generated which down-powers the circuitry required for addressing the primary latching circuits and the electronic devices in the array. Additional means are provided for resetting all of the primary and the auxiliary latching circuits after a given addressing interval is completed.

In a preferred embodiment, the electronic device array is an array of memory cells for use with a digital computer. In addition to the array of memory cells, primary latching circuits and auxiliary latching circuit, certain timing pulse generating circuits preferably are provided on the same monolithic semiconductor chip to implement the addressing of a selected memory cell without burdening the central processing unit of the computer in the generation of said timing signals. Additionally, the on-chip generation of the required timing signals minimizes or eliminates problems associated with the distribution within the chip of timing signals produced off chip and eliminates timing skews that must be provided when the circuits that generate the timing signals are not on-chip with the circuits controlled by the timing signals.

DESCRIPTION OF THE PREFERRED EMBODIMENT

U.S. Pat. No. 3,732,440 issued on May 8, 1973 to Steven Platt et al and assigned to the present assignee discloses an address decoder latching circuit useful in providing bilevel powering to memory cell arrays while permitting the minimization of power required by the memory cell selection (addressing) circuitry. Row and column latching circuits are provided for bilevel powering the selected memory cell in the array, the selected latching circuits providing a low power level to their respective cell when the latches are not set and providing a relatively high power level to their respective cell when the latches are set. As is well understood, the relatively low power level is sufficient to maintain data stability in each memory cell whereas the relatively high power level is required in order to accomplish the writing of new data into the cell or the reading of data from the cell in minimum time. Said patent further teaches that once a given memory cell is selected and its respective latching circuits are set, the input address selection circuits may be down-powered to minimize power dissipation problems.

It will be recognized, of course, that the downpowering of the address selection circuits must not take place before the setting of the selected latching circuits is completed. Although all of the latching circuits in a given memory array may be produced by the same technology and circuit design, unavoidable differences due to fabrication tolerances generally make the response time of the latching circuits nonidentical. In order to assure that the last-to-respopnd latching circuit has been set before down-powering the addressing circuitry, it would be necessary to sense all of the latching circuits of a given array for completion of their setting. The required circuit complexity and sacrifice of semiconductor substrate real estate in micro-circuit embodiments precludes such an approach.

Rather than sensing all of the primary latching circuits, an auxiliary latching circuit is provided in accordance with the present invention, the auxiliary latching circuit being substantially identical to each of the primary latching circuits. The auxiliary latching circuit is set substantially simultaneously with the setting of the selected primary latching circuit, terminates the powering of the memory cell addressing circuits and enables the resetting of all latching circuits upon termination of the chip selection interval.

Figure 1:
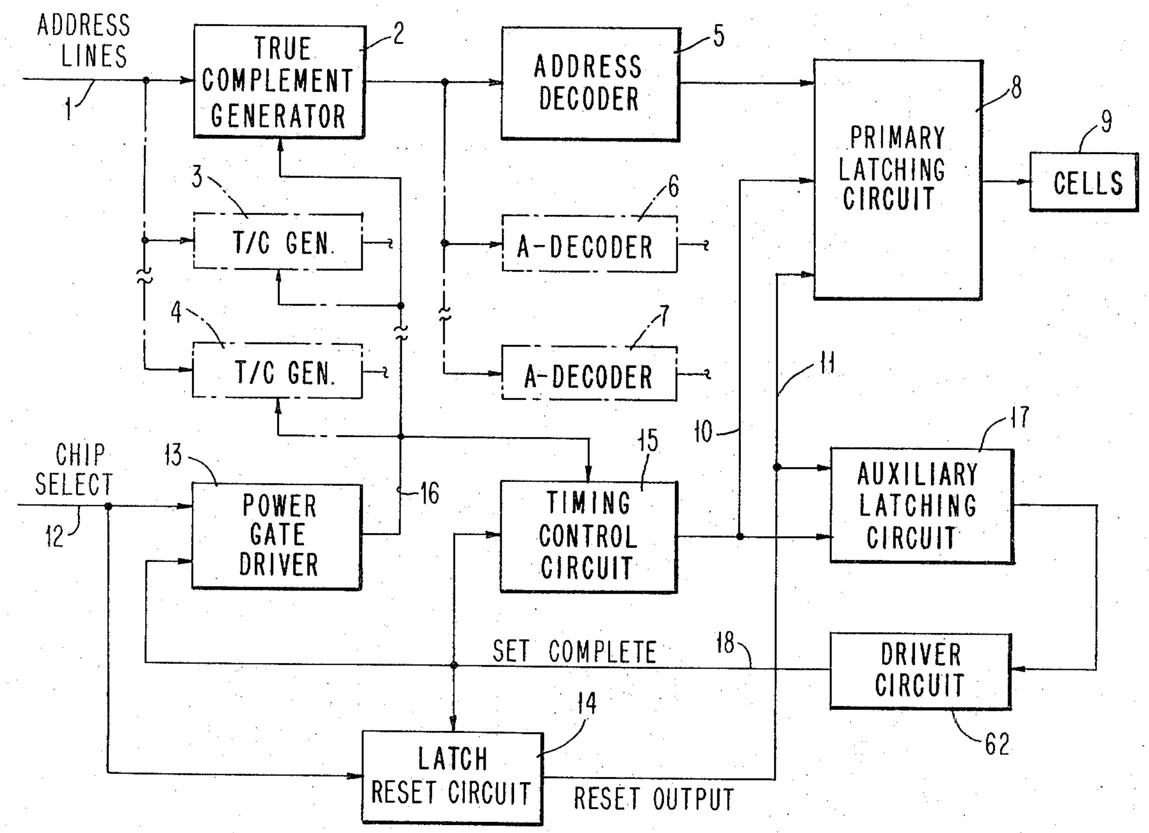
FIG. 1 is a simplified circuit block diagram of the on-chip circuits of a preferred embodiment of the present invention for addressing on-chip memory cells and for downpowering the address selection circuits after cell selection is completed.

FIG. 1 represents in simplified block diagram fashion a preferred embodiment of the invention wherein provision is made on the same monolithic semiconductor chip for all of the necessary powering of the true-complement generators for the address decoders, for the powering of timing control circuit, for the setting of the selected primary latching circuit and the auxiliary latching circuit, and for the enabling of the resetting of all latching circuits promptly upon termination of the chip selection interval. The only signals required from off-chip sources are the usual address signals and chip selection signal. Thus, no additional burden is placed upon the central processing unit of the computer (which utilizes the memory chip in part represented in FIG. 1) to produce the required powering, setting and enabling signals.

The input address lines 1 are coupled to respective true-complement generators 2, 3 and 4 which provide, in known fashion, true and complement signals representing the respective input address signals. Generators 2, 3 and 4 are gated on by the power gate signal on line 16 so that no power is consumed except during the power gate signal. The true and complement signals, in turn, are applied to a number of address decoders 5, 6 and 7 which may be conventional in design. The output of each decoder, such as decoder 5, is applied to a respective primary latching circuit such as circuit 8. Each primary latching circuit, when set, applies a relatively high power level to its row or column associated memory cells 9 and a relatively low power level sufficient to maintain the stored data when not set. A suitable primary latching circuit 8 and memory array cells 9 are shown in the aforementioned U.S. Pat. No. 3,732,440. It will be noted that each primary latching circuit receives three inputs, one from its respective address decoder, a "set" input on line 10 and a "reset" input on line 11.

The chip also receives a chip select signal on line 12 which is distributed to power gate driver 13 and to latch reset circuit 14. Driver 13 delivers an up-powering signal to true-complement generator 2 and to timing control circuit 15 via line 16 in response to the chip select signal on line 12. Timing control circuit 15 provides the set output on line 10 which is applied simultaneously to primary latching circuit 8 and to auxiliary latching circuit 17. The auxiliary latching circuit 17 provides an output signal to driver circuit 62. The output from driver circuit 62 (designated "set complete" on line 18) is applied jointly to power gate driver 13, timing control circuit 15 and to latch reset circuit 14. The set complete signal terminates the power gate driver output signal on line 16 and terminates the set signal output from timing control circuits 15. The termination of the power gate signal, in turn down-powers true-complement generator 2 and timing control circuit 15.

The termination of the chip select signal on line 12 initiates the reset signal output from latch reset circuit 14 which resets all of the primary latching circuits such as circuit 8, resets auxiliary latching circuit 17 and terminates the set complete output from the latter. The termination of the set complete signal output from auxiliary latching circuit 17 terminates the reset signal output from latch reset circuit 14 to complete a full cycle of operation of the on-chip bilevel powering and powering control circuits.

Figure 2:
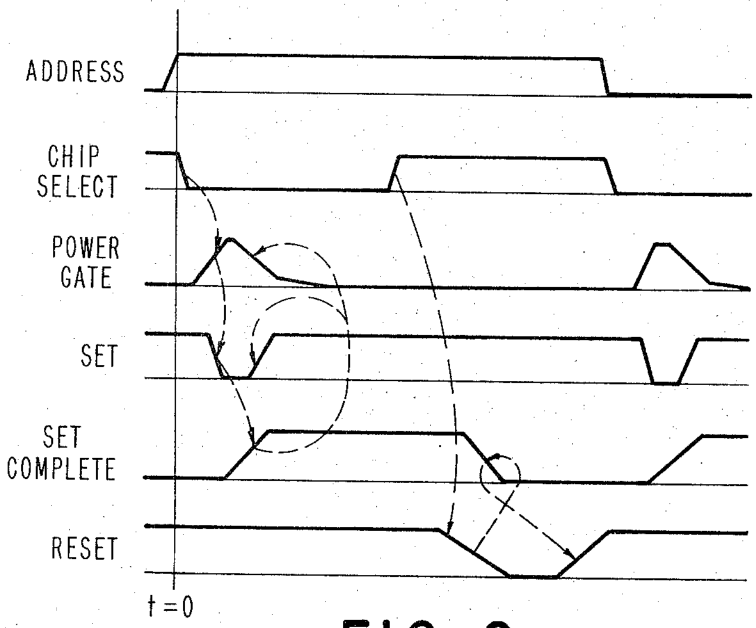
FIG. 2 is a series of idealized waveforms appearing at various points within the embodiment of FIG. 1.

The above described operation is pictorially summarized in the idealized waveforms of FIG. 2 on which are superimposed dashed arrowhead lines showing the causative relationship between the respective waveforms. For example, the initiation of the chip select signal (defined by the falling edge thereof) initiates the leading (rising) edge of the power gate waveform which, in turn, initiates the leading (falling) edge of the set waveform, etc., as indicated by the succession of dashed arrowhead lines.

For the sake of simplicity and clarity of exposition, the design details of the true complement generators and address decoders such as generator 2 and decoder 5 of FIG. 1 have been omitted, these being well within the knowledge of those skilled in the art. Schematic circuit representations of power gate driver 13, timing control circuit 15, auxiliary latching circuit 17, driver 62 and latch reset circuit 14, however, are given in FIGS. 3, 4 and 5.

Figure 3:
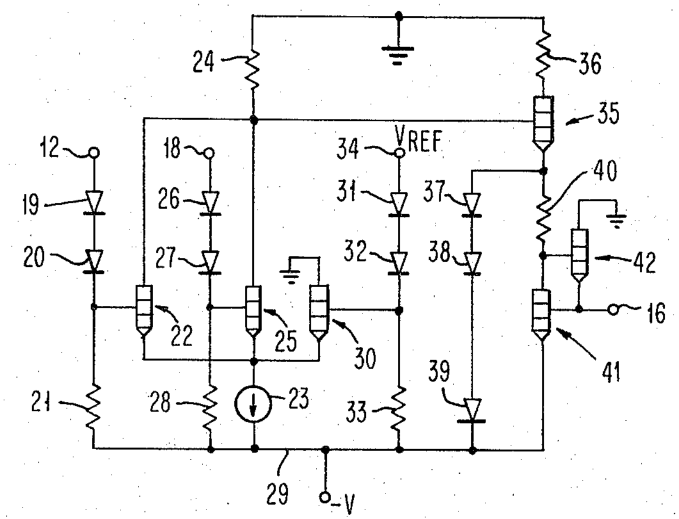
FIG. 3 is a schematic diagram of the power gate driver circuit utilized in the embodiment of FIG. 1.

Referring to FIG. 3, emitter-connected transistors 22, 25 and 30 comprise a three-input current switch. The negative-going leading edge of the chip select signal is applied via line 12, diodes 19 and 20 to the base of NPN transistor 22. Said base is coupled by resistor 21 to a negative voltage applied to line 29. The current from source 23, which previously flowed through transistor 22 and resistor 24 to ground, is diverted from transistor 22 to transistor 30. The base of transistor 30 is biased by diodes 31 and 32, resistor 33, and the voltages applied to terminals 34 and 29 to a voltage level which is intermediate the extremes of both the chip select waveform and the set complete waveform. The base biasing of transistor 25 via diodes 26 and 27 and resistor 28 is determined by the potential applied to bus 29 and the set complete waveform applied via line 18. Transistor 25 is biased off by the relatively low potential of the set complete waveform during this time as shown in FIG. 2. Thus, the falling edge of the chip select waveform occurring when the set complete waveform is at its lower value (biasing off transistor 25) shifts the current from source 23 from transistor 22 to transistor 30, in turn causing a rise in potential at the base of transistor 35.

Transistor 35 is connected in series circuit with resistor 36 and diodes 37, 38 and 39 between ground and line 29. Resistor 40 and transistor 41 are connected across diodes 37, 38 and 39. Transistor 42 is connected between ground and the base of transistor 41 with the base of transistor 42 being connected to the collector of transistor 41. In operation, when transistor 35 is nonconducting, transistor 42 is cut off by the lack of a potential difference across the collector to base junction of transistor 41. When transistor 35 is turned on by the falling edge of the chip select signal, current flows through transistor 41 and provides a potential difference across the collector to base junction which forward biases the emitter base junction of transistor 42 turning it on and raising the potential on output line 16. The power gate waveform provided on output line 16 powers up the true-complement generator 2 and the timing control circuit 15 as discussed in connection with FIG. 1.

Figure 4:
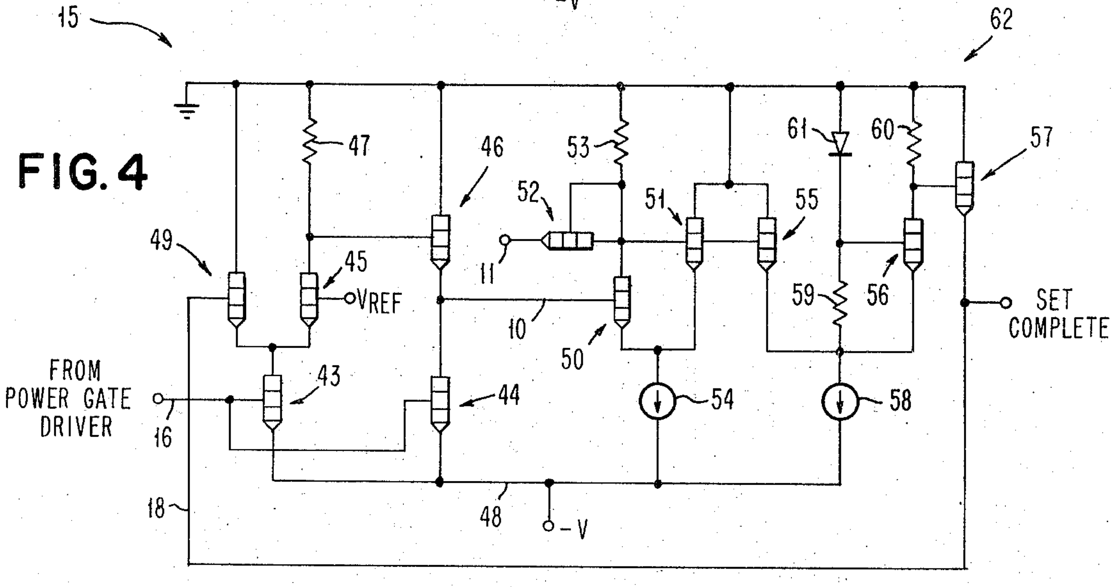
FIG. 4 is a schematic diagram of the timing control circuit, auxiliary latching circuit and driver circuit utilized in the embodiment of FIG. 1.

The power gate pulsed waveform produced on line 16 of FIGS. 2 and 3 powers true complement generator 2 and timing control circuits 15, the latter being shown in more detail in FIG. 4. The power gate pulse on line 16 is applied to the bases of NPN transistors 43 and 44 turning them on. The current from transistor 43 passes through transistor 45 when the set complete voltage on line 18 is low (below the fixed bias applied to the base of transistor 45). The collector of transistor 46 is directly connected to ground. The base of transistor 46 is connected to the collector of transistor 45 and coupled to ground through resistor 47. The voltage drop across resistor 47 during the conduction of transistor 45 reduces the current through transistor 46 lowering the potential at the emitter thereof to the lower level of the set waveform of FIG. 2. Line 10 at the emitter of transistor 46 provides the "set" output signal of FIG. 2 whose initial falling edge is triggered by the rising edge of the power gate waveform.

Auxiliary latching circuit 17 comprises transistors 50, 51 and 52, resistor 53 and current source 54. The emitter-base junction of transistor 51 is coupled across the collector and emitter of transistor 50. Transistor 52 is diode-connected to couple the reset signal of line 11 to the junction between the collector of transistor 50 and the base of transistor 51. Resistor 53 is connected between the collector of transistor 50 and ground. The current from source 54 flows from ground through transistor 51 when the base potential of transistor 51 is near ground as a result of transistor 50 being cut off by the low potential on line 10 at this time.

The driver circuit comprising transistor 55, 56 and 57, current source 58, resistors 59 and 60 and diode 61 receives the base potential of transistor 51 as an input signal applied to the base of transistor 55. The collector of transistor 55 is connected to ground while the emitters of transistors 55 and 56 are connected to current source 58. When the base of transistor 55 is near ground potential transistor 55 conducts the current from source 58 cutting off transistor 56. The base-emitter junction of transistor 56 is biased by the voltage drop across resistor 59 which is connected by diode 61 to ground. During the conduction of transistor 55, transistor 56 is cut off. Resistor 60, connected between the collector of transistor 56 and ground, passes no current to transistor 56 whereby only the base of transistor 57 draws current through resistor 60. Transistor 57 conducts under these conditions raising the potential on line 18 toward ground and initiating the rising portion of the set complete waveform of FIG. 2.

The "set complete" waveform of line 18 is applied to the power gate driver of FIG. 3 and through conducting diodes 26 and 27 to the base of transistor 25 turning it on and diverting current away from previously conducting transistor 30. The conduction of transistor 25 lowers the base potential of transistor 35 rendering transistor 35 nonconductive. The nonconduction of transistor 35, in turn, turns off transistors 41 and 42 causing the power gate waveform signal on line 16 to revert to its low voltage or "off" level and turning off all gated current sources such as sources 43 and 44 of the timing control circuit of FIG. 4.

The rising edge of the set complete waveform on line 18 also initiates the rising trailing edge of the "set" waveform of line 10. Referring to FIG. 4, the set complete waveform turns on transistor 49, turning off transistor 45 and thereby biasing transistor 46 further into conduction. Upon the conduction of transistor 46, the voltage of line 10 rises toward ground.

It will be noted that upon the termination of the "set" waveform of FIG. 2 (the rising edge thereof), transistor 50 of the auxiliary latching circuit 17 of FIG. 4 is not turned on despite the rise in the base voltage thereof because the forward bias on transistor 51 is even higher. As shown more particularly in the aforementioned U.S. Pat. No. 3,732,440, the conduction of the transistor corresponding to transistor 50 of the auxiliary latching circuit 17 continues until the base of the transistor corresponding to transistor 51 is reset to a cutoff potential by conduction of the diode-connected transistor corresponding to transistor 52.

The primary latching circuit 8 preferably is identical to auxiliary latching circuit 17 except for the lack of an address decoder input to the latter. The address decoder input for primary latching circuit 8 conveniently is provided by a multi emitter transistor whose common collector is connected to the base of the transistor corresponding to transistor 51 of the auxiliary latching circuit 17. The current supplied to memory cell 9 of FIG. 1 by the primary latching circuit is reduced when the transistor corresponding to transistor 50 of the auxiliary latching circuit 17 conducts while the current is increased when the transistor corresponding to transistor 51 conducts. As shown in the cited U.S. Pat. No. 3,732,440, the memory cell is connected in series between the current source of the primary latching circuit (corresponding to current source 54 of the auxiliary latching circuit) and the emitters of the transistors corresponding to transistors 50 and 51. Thus, the memory cells such as cells 9 are down-powered except for the time between the leading (falling) edge of the set waveform and the leading (falling) edge of the reset waveform provided by latch reset circuit 14 shown in FIG. 5.

Figure 5:
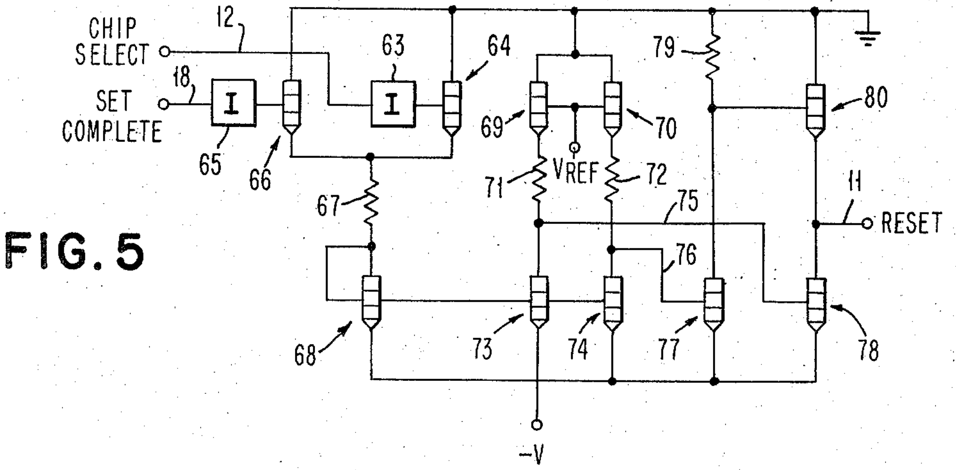
FIG. 5 is a schematic diagram of the latch reset circuit of the embodiment of FIG. 1.

Referring to FIG. 5, the occurrence of the trailing (rising) edge of the chip select waveform on line 12 is applied via inverter 63 to the base of transistor 64. The set complete waveform on line 18 is applied via inverter 65 to the base of transistor 66. The collectors of transistors 66 and 64 are jointly connected to ground. The emitters of transistors 66 and 64 are connected through resistor 67 and diode-connected transistor 68 to a source of potential −V. The collector and base of transistor 68 are connected to each other. The commonly connected collectors of transistors 69 and 70 are connected to ground. The bases of transistors 69 and 70 are connected to a source of negative reference potential. The emitters of transistors 69 and 70 are connected through respective resistors 71 and 72 and respective transistors 73 and 74 to the potential source −V. The bases of transistors 68, 73 and 74 are connected to each other.

In the operation of the latch reset circuit described so far, the set complete waveform on line 18 and the chip select waveform on line 12 vary in potential about the reference potential applied to the bases of transistors 69 and 70. At the time of interest, the set complete waveform is at its upper voltage value (above the reference voltage) and the chip select waveform is rising to its upper (above the reference voltage) value. The inverted set complete and chip select waveforms are applied to the bases of respective transistors 66 and 64 causing them to conduct a relatively low value of current which flows through resistor 67 and diode-connected transistor 68. Inasmuch as each transistor 68, 73 and 74 receive the same base-emitter potential, transistors 73 and 74 also conduct a relatively low current and produce a relatively high potential on lines 75 and 76.

Transistors 77 and 78 are rendered conductive or not depending upon the potential applied to their bases via lines 75 and 76. The emitters of transistors 77 and 78 are connected to potential source. The collector of transistor 77 is connected via resistor 79 to ground. The collector of transistor 78 is coupled to ground via the emitter-collector conduction path of transistor 80. The base of transistor 80 is connected to the node between resistor 79 and transistor 77. When the potential on lines 75 and 76 is relatively high, transistors 77 and 78 are rendered conductive causing the reset potential at output line 11 at the collector of transistor 78 to fall.

When either or both of the chip select and set complete waveforms on lines 12 and 18, respectively, are at their low values, the corresponding transistors 64 and 66 are caused to conduct a relatively high value of current. The result is an increased current through transistor 68 and, hence, also through slaved transistors 73 and 74. The consequent lowered potential on lines 75 and 76 turns off transistors 77, and 78. When transistor 78 is cut off, the reset waveform on output line 11 is no longer conductively clamped to the −V line. With the nonconduction of transistor 77, no current flows through resistor 79 and the emitter of transistor 80 and output line 11 follow the base thereof which is now at the upper (ground) potential level.

It will be noted from FIG. 2 that the falling edge of the set complete waveform initiates the rising edge of the reset waveform to complete a full cycle of operation of the on-chip bilevel powering and power control circuit. Referring to FIG. 4, the falling (leading) edge of the reset waveform on line 11 is coupled through diode 52 to the base of transistor 51 cutting it off and allowing transistor 50 to turn on inasmuch as the base potential thereof is at the up potential of the set waveform (higher than the down potential of the reset waveform). The same action takes place simultaneously on the primary latching circuit 8 wherein the transistor corresponding to transistor 50 of auxiliary latching circuit 17 turns on and down-powers the memory cell 9.

The falling edge of the reset waveform on line 11 also is applied to the base of transistor 55 of driver circuit 62 of FIG. 4, turning it off and switching the current from source 58 to transistor 56. The resulting current flow through resistor 60 reduces conduction in transistor 57 and causes the set complete waveform on line 18 to fall. As previously explained, the falling of the set complete waveform initiates a series of events in the latch reset circuit of FIG. 5 to cause the reset waveform on line 11 to return to its up potential.

While this invention has been particularly described with reference to the preferred embodiments thereof, it will be understood by those skilled in the art that the foregoing and other changes in form and details may be made therein without departing from the spirit and scope of the invention.

What is claimed is:

1. In an array of electronic devices having primary latching circuits, each primary latching circuit being connected to respective devices for up-powering said devices when set to a first condition and for down-powering said devices when reset, said first condition being fulfilled by the concurrence of an address signal from powered addressing circuits and a set signal, means for down-powering said powered addressing circuits following the fulfillment of said first condition comprising;

an auxiliary latching circuit, first means for applying said set signal jointly to said primary and to said auxiliary latching circuits, said auxiliary latching circuit producing a set complete signal when set, and second means for applying said set complete signal to said powered addressing circuits for down-powering said powered addressing circuits.

2. The apparatus defined in claim 1 wherein said electronic devices are memory cells and said auxiliary latching circuit is substantially identical to each of said primary latching circuits.

3. The apparatus defined in claim 2 wherein said second means for applying comprises a powered gate driver responsive to a select signal and to said set complete signal, said power gate driver producing a power gate signal in response to said select signal, said power gate driver terminating said power gate signal in response to said set complete signal, said power gate signal being applied to said powered addressing circuits for up-powering said powered addressing circuits.

4. The apparatus defined in claim 3 wherein said powered addressing circuits comprise a true-complement generator and an address decoder, said power gate signal being applied to said generator.

5. Apparatus as defined in claim 4 wherein said array of memory cells, primary latching circuits, auxiliary latching circuit, powered addressing circuits, and said means for down-powering said powered addressing circuits are on the same monolithic semiconductor substrate.

* * * * *